Nov. 28, 1967   G. DE COYE DE CASTELET   3,354,949
TUBULAR RADIATOR WITH FINS
Filed Jan. 15, 1965   3 Sheets-Sheet 1

Inventor
Gaëtan De Coye De Castelet
By Stevens, Davis, Miller & Mosher
Attorneys Nov. 28, 1967     G. DE COYE DE CASTELET     3,354,949
TUBULAR RADIATOR WITH FINS
Filed Jan. 15, 1965     3 Sheets-Sheet 2
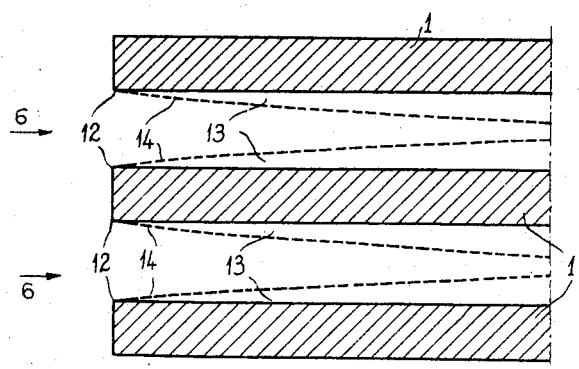
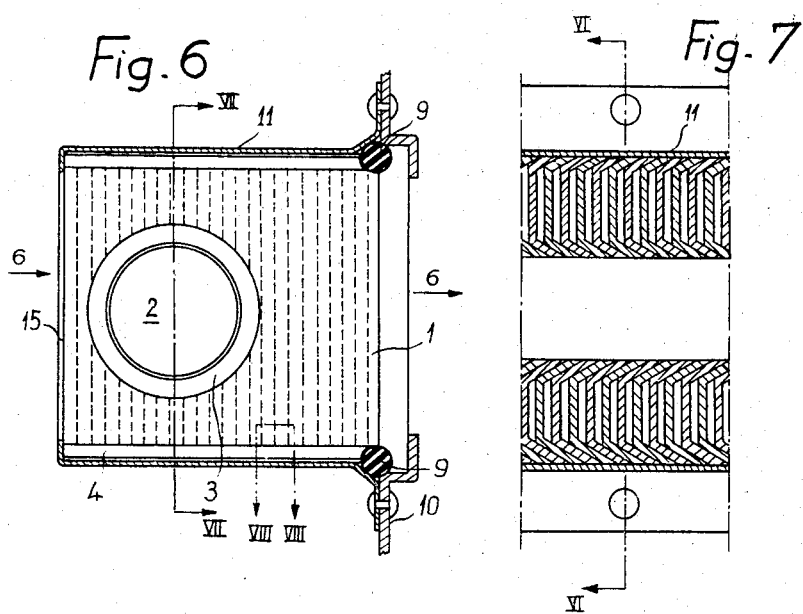
Inventor
Gaëtan De Coye De Castelet
By Stevens, Davis, Miller & Mosher
Attorneys Nov. 28, 1967 G. DE COYE DE CASTELET 3,354,949
TUBULAR RADIATOR WITH FINS
Filed Jan. 15, 1965 3 Sheets-Sheet 3
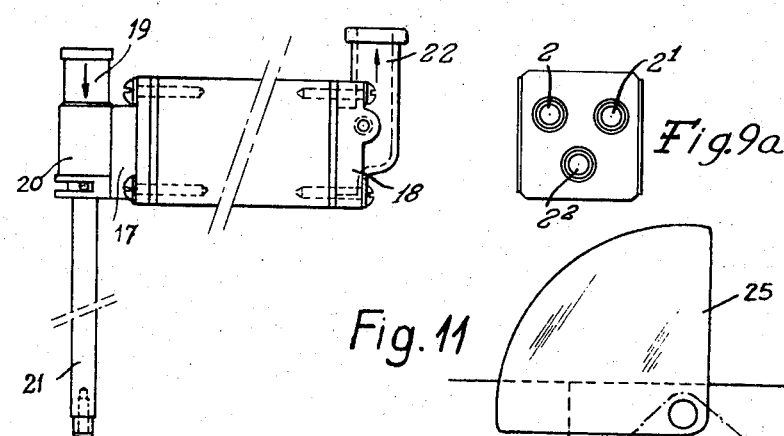
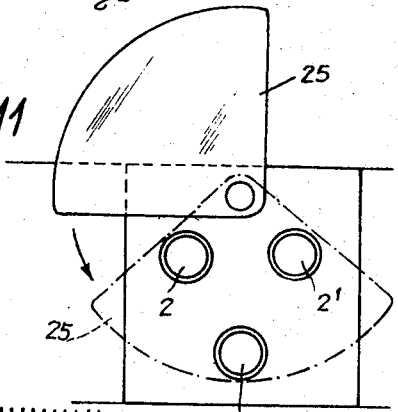
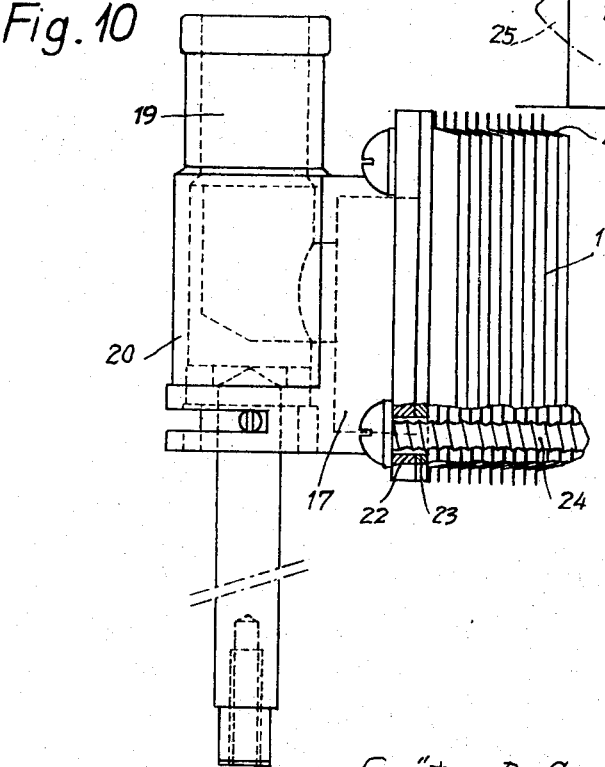
Inventor
Gaétan De Coye De Castelet
By Stevens Davis Miller & Mosher
Attorneys United States Patent Office 3,354,949
Patented Nov. 28, 1967

3,354,949
TUBULAR RADIATOR WITH FINS
Gaetan de Coye de Castelet, Billancourt, France, assignor to Regie Nationale des Usines Renault, a French works
Filed Jan. 15, 1965, Ser. No. 425,736
Claims priority, application France, Jan. 18, 1964, 960,807, Patent 1,391,850; Mar. 5, 1964, 966,241, Patent 86,065; Dec. 30, 1964, 475, Patent 87,095
5 Claims. (Cl. 165—181)

ABSTRACT OF THE DISCLOSURE

An improved tubular radiator formed by a plurality of finned plates which are stacked closely adjacent one another thereby forming a central orifice. The improvement obviates the need for supporting tubes and like members.

---

The present invention has for its object improvements made in the design and construction of tubular radiators with fins, constituted by small plates with a central orifice or a number of orifices, stacked one on the other so as to form one or more conduits with fins, without the use of supporting tubes.

The improvements forming the object of the invention relate to:

(1) the external shape of the fins with the object of increasing their effectiveness and facilitating their assembly;
(2) the ease of assembly;
(3) the ready mounting and utilization of the whole unit on an automobile vehicle.

The proposed mounting permits:

(1) the elimination of the assembly constituted generally by a guiding angle-iron employed to keep the fins in position before soldering. The main drawback of this angle-iron, apart from its cost, was that it had a very high heat inertia with respect to the aerotherm to be assembled and thus of necessitating greater heating and a larger furnace;
(2) the elimination of tinning;
  (a) The interior of the central tube or tubes formed by the assembly of the fins, which has proved unnecessary in the case of copper brazing;
  (b) the exterior, which can be replaced by an application of paint by immersion for example.

The improvements forming the object of the invention consist of providing on two opposite edges of the small plate forming the fin, a bent-back portion of these edges to facilitate the centering of the fins. In order to simplify the description, the invention will be described for the case of a plate with a single central orifice, as the invention is not modified by the number of orifices.

It has been observed that in the case of the laminar flow of a gas between the fins, and starting from the central plane located between two adjacent fins, the different layers of gas are increasingly impeded or slowed down as they come closer to the wall of the fins. Thus, the exchange of heat is less considerable in a region close to the wall, known as the "boundary layer." Furthermore, this layer is thinner close to the leading edge of the fin.

One of the objects of the invention is to protect the tubular conduit or the assembly of tubular conduits from the adverse effect of boundary layers which have excessive thicknesses.

According to the invention, this object is attained by an adequate eccentricity of the conduit or of the assembly of conduits in the direction of the leading edges of the fins, in order that this conduit or this assembly may no longer be in the zone of maximum thickness of the boundary layers.

In accordance with an alternative form of construction the general shape of the fins can be improved in order to reduce the size of the boundary layer. The fins are then provided with a transverse goffering or grooving, that is to say a goffering or grooving in which the projecting parts are orientated transversely with respect to the direction of flow of the gas.

Another improvement consists of adding to the single tube or multi-tube elements of the radiator, removable end pieces in the form of water-boxes which can serve as couplings for conduits, drainage couplings, couplings for cocks or for any other appropriate use, made of a suitable material. The invention also relates to certain details of construction which will be more particularly described below.

The invention also concerns certain accessory arrangements which will also be described in more detail later.

In the accompanying drawings:

FIG. 5 illustrates diagrammatically a phenomenon which it is desirable to remedy;

FIG. 6 is a view in cross-section of a radiator with fins according to the invention, with an eccentric conduit;

FIG. 7 is a view in cross-section of a part of the radiator, taken along the line VII—VII of FIG. 6;

FIG. 8 is a view in cross-section of two goffered fins taken along the line VIII—VIII of FIG. 6;

FIG. 9 is a diagrammatic external view of a radiator with fins provided at its two extremities with end-pieces in accordance with the invention;

FIG. 9a is a plan view of an alternate embodiment of the plate;

FIG. 10 is a detail view to a larger scale, showing the detail of the fixation, given by way of example, of an end-piece on the radiator, this end-piece carrying the regulating cock;

FIG. 11 represents a cross-section of the water-box, showing an alternative form of construction of the regulating tap.

Figure 1:
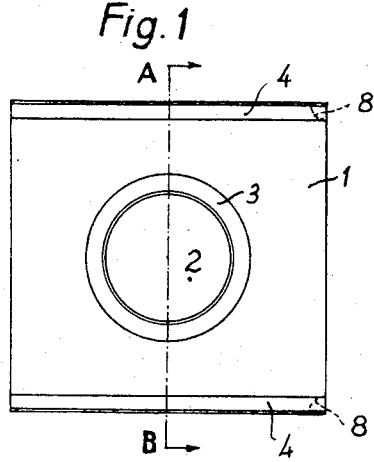
FIG. 1 is a front view of the plate forming a fin which is the object of the invention, having a single central orifice.
Figure 2:
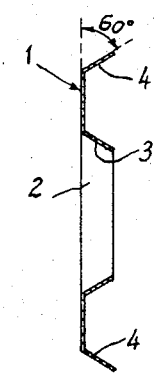
FIG. 2 is a cross-section taken along the line AB of FIG. 1.
Figure 3:
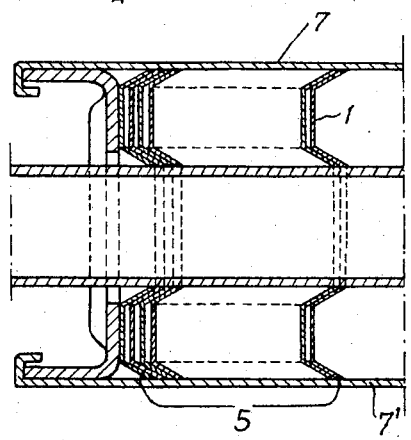
FIG. 3 is a cross-section of a tube with fins, taken along a plane passing through the horizontal axis of the tube in course of assembly.

Referring now to the drawings, and more particularly to FIGS. 1 and 2, it is seen that the rectangular plate 1 forming a fin is provided with a central orifice 2, of which the edge or collet 3, bent or stamped, is of conical form so that the edges of the central orifices of the fins which form the tube fit into each other while maintaining the fins spaced apart from each other. In the arrangement which forms more particularly the object of the invention, two opposite edges 4 of the fin are bent back to an angle suitably fixed at about 60°, depending on the distance apart of the fins. The utility of this turned-back edge is:

to facilitate the centering of the fins by adding their action to the centering provided by the central orifices;
to adjust the distance apart of the fins with greater accuracy, by virtue of the elasticity along the axis of the conduit, obtained by reason of the flexibility of these bent-back edges about their line of folding;
to obtain a geometrically correct stack, in which the manufacturing tolerances are automatically absorbed by the elasticity of these bent-back edges about their line of folding;

by these means, to permit, as indicated above, the use of a fluid brazing acting by capillary action so as to ensure the fluid-tightness of the conduits and the strength of the aerotherm device.

The method of assembly is as follows:

The fins are stacked one on the other with a certain pressure, the distance apart being determined on the one hand by the angle of the collets forming conduits with their axis and on the other hand by the elasticity of the bent-back lateral edges. These fins are held together in the assembled position by a light mounting constituted either:

(1) by two metal side sheets (placed at 7, 7′, for example) and bent back at their two extremities. This steel sheet can be recovered after brazing when so desired or may serve as a fixing support on the vehicle;
(2) by binding the packet together with one or more metal wires;
(3) by clamping on a stainless steel tube inside the central conduit and having a definitely smaller diameter than this conduit.

The brazing is effected by laying down a brazing bead inside the central bore, parallel to the axis of the aerotherm device, arranged horizontally.

The brazing will be effected with advantage with copper or with a copper alloy which:

gives a good mechanical performance and corrosion-resisting properties, does not necessitate any final pickling and permits the passage of a second flux in order to carry out re-touching or repairs. The brazing is facilitated by the more uniform spacing of the fins, permitting the brazing material to be distributed by capillary action;
makes it unnecessary to apply any internal protection;
permits the bending of the whole of the radiator without damaging it or interfering with its fluid-tightness, so that it can be made to follow the curves of a body;
the external protection can be effected by immersion painting with blowing between the fins during the course of drying in order to eliminate the solvent vapor.

Figure 4:
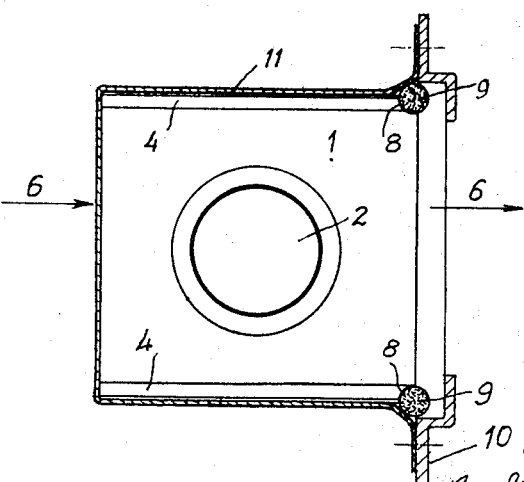
FIG. 4 shows diagrammatically, by way of example, the mounting of a tube with fins on a vehicle.

The form of the fins may be completed by:

(1) A cutting-out 8 of the corners so as to form a groove in which will be laid a seam of putty 9 (FIG. 4) at the time of mounting in the corresponding compartment on the wall 10 of the body, and intended to effect fluid-tightness by a simple and effective means. The aerotherm device is then held on the wall 10 by means of clamping straps 11, the air coming in from the exterior through the orifices at the rear of the engine bonnet, passing through the aerotherm device inside the body, following the direction 6—6.
(2) Bosses or slits to take advantage of the peak effect on the passage of the air and to improve the efficiency of the aerotherm device.
(3) Baffles or obstacles arranged in the interior of the central tube, intended to create turbulence and high speeds close to the walls in the liquid circulating in this tube.

This obstacle can be advantageously constituted by a second tube introduced into the central conduit, which for the same rate of flow of fluid causes it to circulate at higher speed along the walls, and increases the efficiency of the radiator; this internal tube can also serve as an exchanger with a second fluid, utilized for example for cooling purposes.

Reference will now be made to FIGS. 5 to 8. It is intended to protect the tubular conduits of the assembly of tubular conduits from the adverse effect of boundary layers having thicknesses which are too great. This phenomenon is brought out in a diagrammatic manner in FIG. 5, in which there have been shown the leading edges of three plates or fins commencing close to the corners 12 of the leading edges. Boundary layers 13 comprised between the broken lines 14 and the surfaces of the fins appear as soon as the gas circulates between the fins at a certain speed in the direction of the arrow 6.

One of the objects of the invention is to protect the tubular conduit or the assembly of tubular conduits from the unfavorable effect of the boundary layers, by virtue of the following arrangement:

The fins or plates 1 of the radiator shown in FIGS. 6 and 7 are square and have a conduit which is off-center in the direction of the leading edges 15 of the fins. This conduit is constituted by the stamped edges of orifices 2, these stamped edges being engaged one in the other. The opposite edges 4 of the fins are applied against each other. The angle of the stamped edges and the opposite edges 4 on the outside is chosen in such manner that a space remains between the non-bent parts of the fins. The radiator is supported on a perforated wall 10 by means of straps 11, the gas being pulsated by means of a device (not shown) through the radiator in the direction of the arrows 6. Joints 9 ensure fluid-tightness between the radiator, the strap 11 and the wall 10.

The approximate dimensions of the radiator shown by way of example are 40 x 40 mm., for the plates 1 and 20 mm. for the diameter of the tubular conduit. The free space for the passage of the gas between the plates is about 1 mm.

Generally speaking, the most favorable position of the conduit or of the assembly of conduits is located on the upstream side and depends essentially on the nature of the flow and therefore on the Reynolds number which must remain below its critical value.

The fins may be smooth or goffered as in the example shown and may be provided with projections or grooves orientated transversely with respect to the direction 6 of the gas. This goffering or grooving according to the invention results in the elimination of the boundary layer on the projections and behind the latter in the zones 16 (FIG. 8).

It is self-evident that the eccentricity of the conduit or of the assembly of conduits and the goffering or grooving may be employed separately or in combination.

The constructions of FIGS. 9, 10 and 11 will now be examined.

In the case of FIG. 9, it can be seen that the radiator is provided with three tubular conduits 2, $2^1$, $2^2$ arranged in a triangle (as shown in the plan view of FIG. 9a), with end-pieces 17, 18 fixed on the extremities of the radiator. The latter is of the type with fins 1 with bent-back edges 4 coming into contact with each other (see FIG. 10) as has been described previously.

In the construction given by way of example, the end piece 17 forms a water intake box with a coupling 19 and the plug of the cock 20, in order to cause the coupling 19 to communicate with the conduits of the radiator, the plug 20 being operated by the rod 21. The coupling 18 is shown in this case with an elbow 22 for the water outlet from the radiator.

There has been shown in FIG. 10 a method of fixing of the end-pieces, given by way of example. The end-piece 17 is provided with an edge 22 which is supported through the intermediary of the joint 23 on the extremity of the radiator. The fixing is obtained by metal screws 24, the heads of which rest on the edge 22 and which screw into the fins 1.

The combination of the tubes and the water-boxes in the case of elements with multi-tube plates is effected in such manner as to obtain at the same time the best possible flow of air transversely round the tubes with a view to a favorable thermal exchange efficiency by means of an arrangement of the orifices of the plates which form the tube, in a triangle (as shown in FIG. 9a), in a circular arc, or following any other appropriate form, and in permitting the installation in the end water-box of a tap of simple type, known per se, as described above. This tap could with advantage be chosen for example of the type with a rotating bearing surface 25 (FIG. 11) which successively closes the orifices of passage for the fluid, giving a positive regulation of the heating with as many positions (plus one) as there are orifices in the plates, more effective than regulation by an ordinary plug closing more or less a single passage.

The bearing surface 25 would be mounted in the water-box facing the first plate of the radiator, while providing the necessary sealing joints for the movement of the closure surface, which is shown in FIG. 11 in full lines in the position of non-closure and in chain-dotted lines in the position of complete closure of the orifices of the radiator.

It is also possible to provide for the addition of water-boxes following the above arrangement which serve simultaneously any number of mono-tubular or multi-tubular elements.

What is claimed is:

1. A finned tubular radiator comprising a plurality of stacked elements, each said element comprising a substantially rectangular plate having at least one conically flanged orifice therein, said plate's orifice being eccentrically positioned in said plate in the upstream direction of gaseous flow through the radiator, the ratio of the surface area of the plate to area of the orifice being no less than five to one, at least two opposing edges of said plate having an angle of inclination with respect to the plane of the plate so as to form closed outer side plates on said radiator, said flanged plate orifice and said opposing edges serving to facilitate the centering of said plates forming said stacked elements and thereby defining a free space between two contiguous plates and means for holding said plates in fixed relationship.

2. A tubular radiator according to claim 1 in which the portions of each plate which are not in contact with the adjacent plates have goffering, the projections of which are directed transversely with respect to the direction provided for the passage of gas between the fins.

3. A tubular radiator according to claim 1 in which said flanged orifices form a continuous conduit.

4. A tubular radiator according to claim 1 in which removable end pieces are mounted on the extremities of said radiator, said end pieces having the form of water-boxes and being capable of serving as conduit couplings, drainage couplings, coupling for taps and like uses.

5. A tubular radiator according to claim 1 in which said radiator is controlled by a regulating valve having rotating surfaces adapted to close successively the various orifices of passage of the fluid, screw means with heads on the plates of the radiator fixing the end pieces thereon.

References Cited

UNITED STATES PATENTS

| 780,565 | 1/1905 | Humphrey | 165—151 X |
|---|---|---|---|
| 1,194,473 | 8/1916 | Bovey | 29—157.3 |
| 1,710,579 | 4/1929 | Henshall | 165—151 |
| 1,907,036 | 5/1933 | Belleau | 165—182 X |
| 1,940,804 | 12/1933 | Karmazin | 165—151 |
| 2,454,357 | 11/1948 | Tolan | 165—182 |
| 2,682,391 | 6/1954 | Downs | 165—76 X |
| 2,899,178 | 8/1959 | Dubin et al. | 165—182 |
| 2,908,485 | 10/1959 | Longwell | 165—101 X |
| 2,959,400 | 11/1960 | Simpelaar | 165—166 |
| 3,231,017 | 1/1966 | Henderson | 165—166 |
| 3,249,155 | 5/1966 | Huet | 165—166 |

FOREIGN PATENTS

| 13,214 | 1902 | Great Britain. |
|---|---|---|
| 700,157 | 11/1953 | Great Britain. |

ROBERT A. O'LEARY, Primary Examiner.

MEYER PERLIN, Examiner.

N. R. WILSON, T. W. STREULE, Assistant Examiners.